Aug. 7, 1951  J. A. SHAFER  2,563,428
SNUBBED BOLSTER CAR TRUCK
Filed Jan. 23, 1946  4 Sheets-Sheet 1
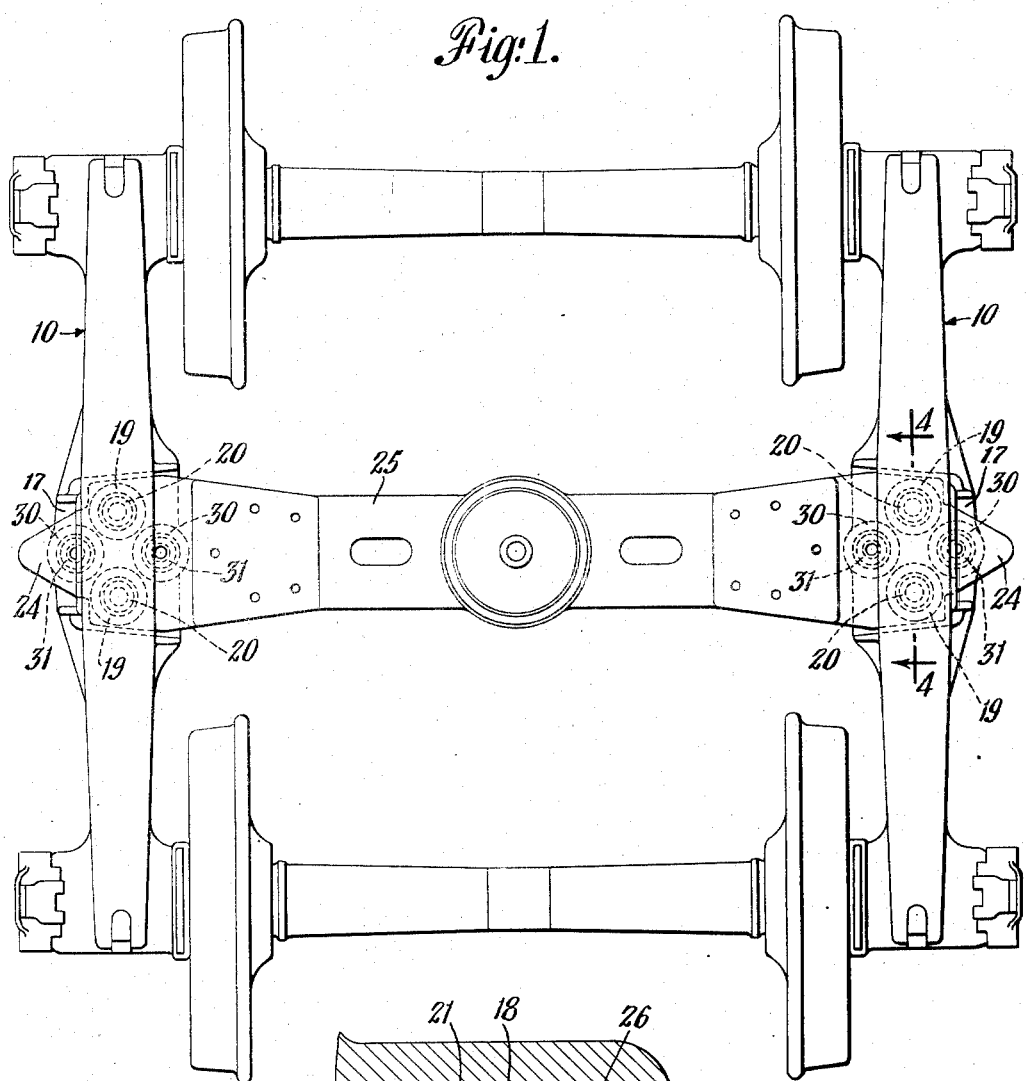
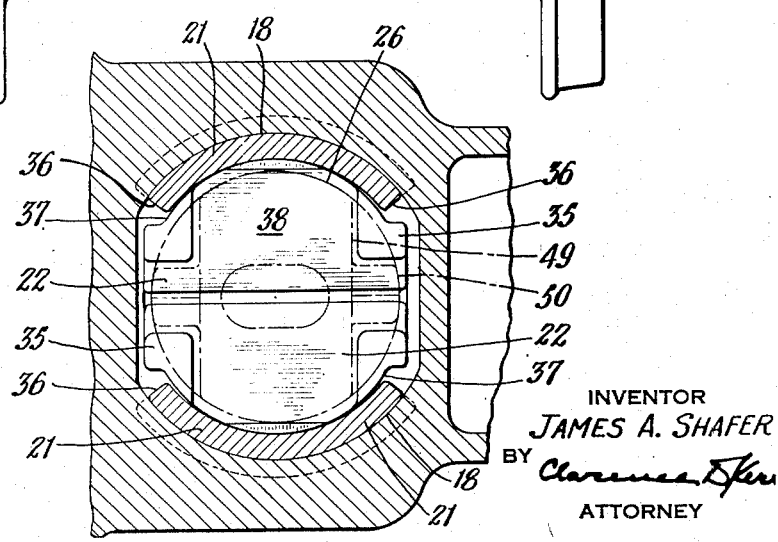
INVENTOR
JAMES A. SHAFER
BY
ATTORNEY Aug. 7, 1951     J. A. SHAFER     2,563,428
SNUBBED BOLSTER CAR TRUCK
Filed Jan. 23, 1946     4 Sheets-Sheet 2
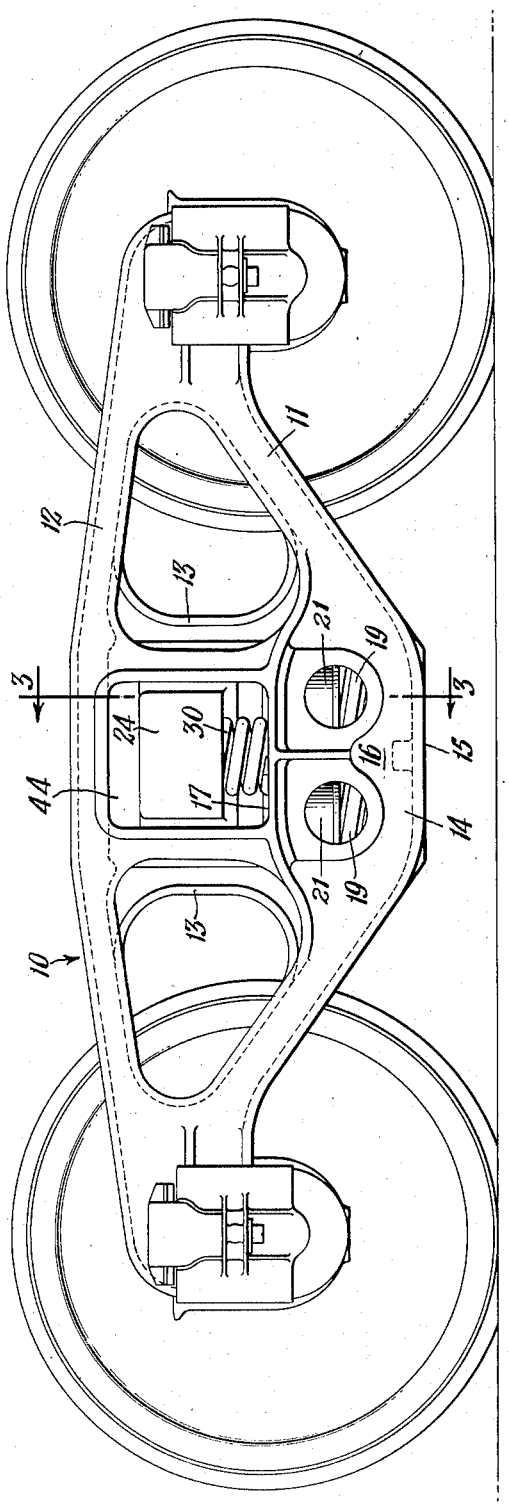
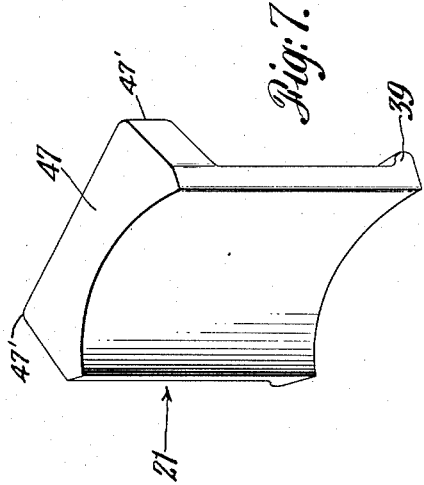
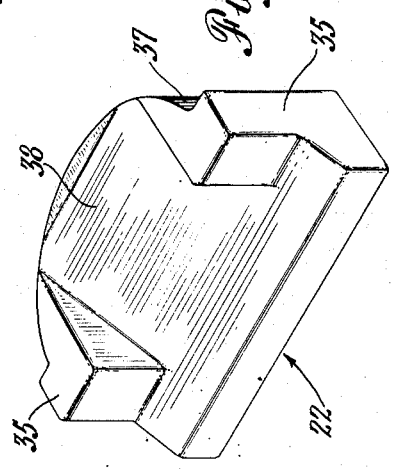
INVENTOR
JAMES A. SHAFER
BY
ATTORNEY

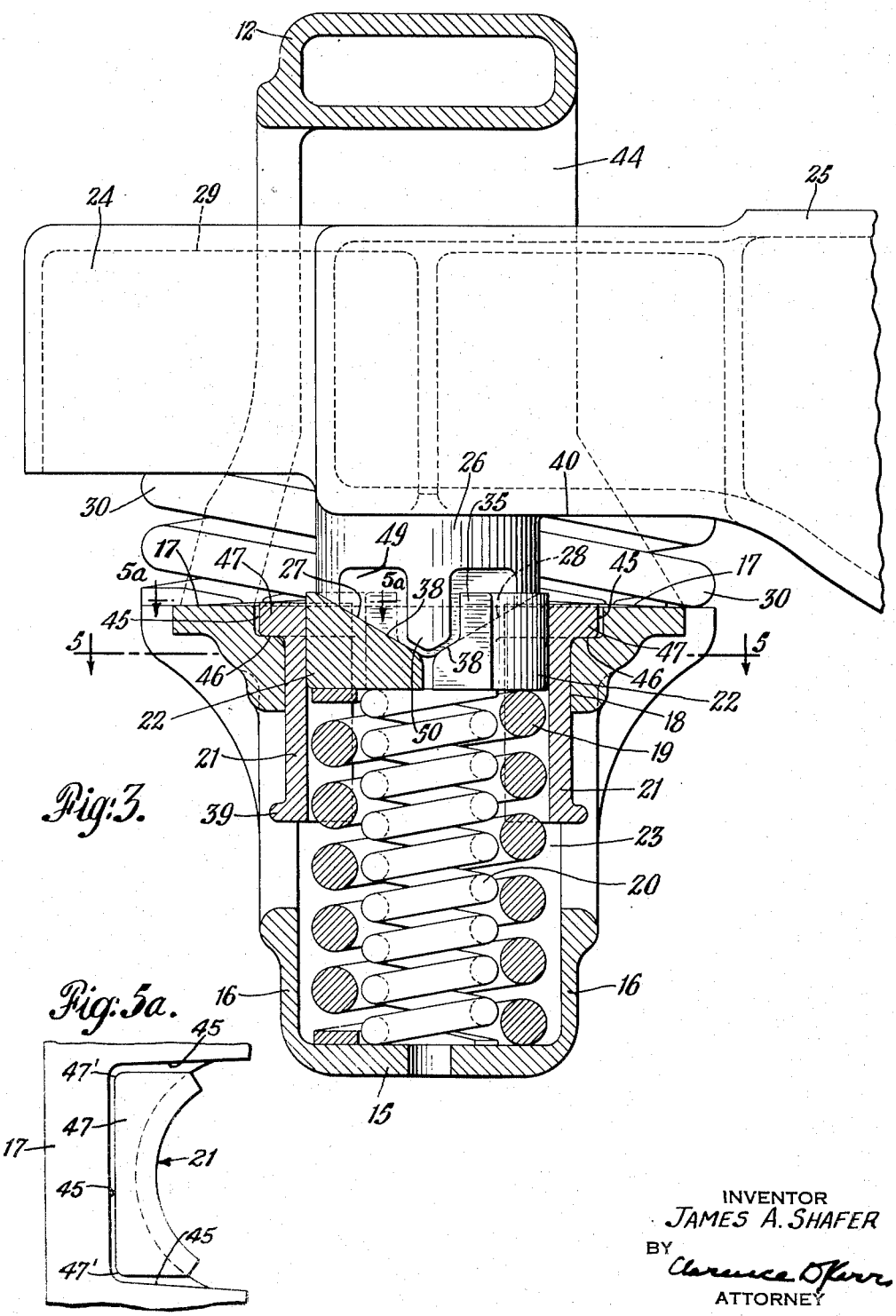

Patented Aug. 7, 1951

2,563,428

UNITED STATES PATENT OFFICE 2,563,428

SNUBBED BOLSTER CAR TRUCK

James A. Shafer, East Cleveland, Ohio, assignor to National Malleable and Steel Castings Company, Cleveland, Ohio, a corporation of Ohio Application January 23, 1946, Serial No. 642,793

5 Claims. (Cl. 105—197)

This invention relates to trucks for railway cars, and more particularly to freight car trucks of the type which utilizes friction mechanism for damping the spring action between side frames and bolster.

It is an object of my invention to provide improvements in friction damping mechanism for such trucks, with special reference to obtaining more uniform contact, and increased area of contact, between the bolster and friction shoes of trucks in which wedge surfaces on the bolster are designed for engagement with friction shoes of the damping mechanism. In my prior Patent No. 2,187,434, I have shown a car truck in which projections on the under side of the bolster engage friction shoes of a damping mechanism to wedge them against a friction sleeve. In order to limit movement of the bolster transversely of the side frame, it was necessary in that construction to divide wedging contact of the shoes with the bolster between two surfaces separated by a vertical section. The use of two separated wedging surfaces for each shoe creates a problem in obtaining uniform division of wedging pressure between the separate surfaces. In some cases it may even be found that all of the wedging pressure is taken by one of the wedge surfaces of the shoe, and that the other wedge surface of the shoe is not even in contact with the bolster. Under such conditions, contact between the bolster and the two separate wedge surfaces of the friction shoe may not be obtained even after a considerable period of use, notwithstanding the tendency to wear down the "high" surface.

Another disadvantage of constructions in which wedging contact of the shoes with the bolster is divided between separated surfaces as described, is that this reduces the total available bearing area between the shoes and bolster. This is because of the necessity of providing lateral clearance between the vertical section of the shoes and bolster which separates the wedge surfaces.

Accordingly, it is an object of my invention to overcome the aforesaid disadvantages, and to provide a friction damping mechanism adaptable to existing truck designs which will insure more uniform bearing contact between the wedge surfaces of the bolster and friction shoes, as well as increased area of contact therebetween, while maintaining adequate vertical thrust bearing surfaces within comparable overall space limitations.

A further advantage of the invention disclosed herein is that it facilitates machining of the contacting bearing surfaces of the bolster and friction shoes.

A still further advantage of my invention is that it provides substantially maximum vertical thrust surfaces ("vertical interlock") regardless of the angle of the wedge surfaces of the bolster and shoes.

Other objects and advantages of my invention will appear as the description proceeds.

In the drawings:

Fig. 1 is a plan view of a car truck comprising a bolster and side frames embodying the invention, and Fig. 2 is a side elevational view of the same.

Fig. 3 is an enlarged cross-sectional view taken as indicated at 3—3 in Fig. 2, with the bolster, bolster projection and one of the friction shoes shown in elevation.

Fig. 5 is a detail sectional view taken as indicated at 5—5 in Fig. 3 with the correlative position of one of the projections 26 being shown in dot dash outline.

Fig. 5a is a detail view taken as indicated at 5a—5a in Fig. 3.

Figs. 6 and 7 are detail perspective views of one of the friction shoes and sleeve segments respectively.

Figure 4:
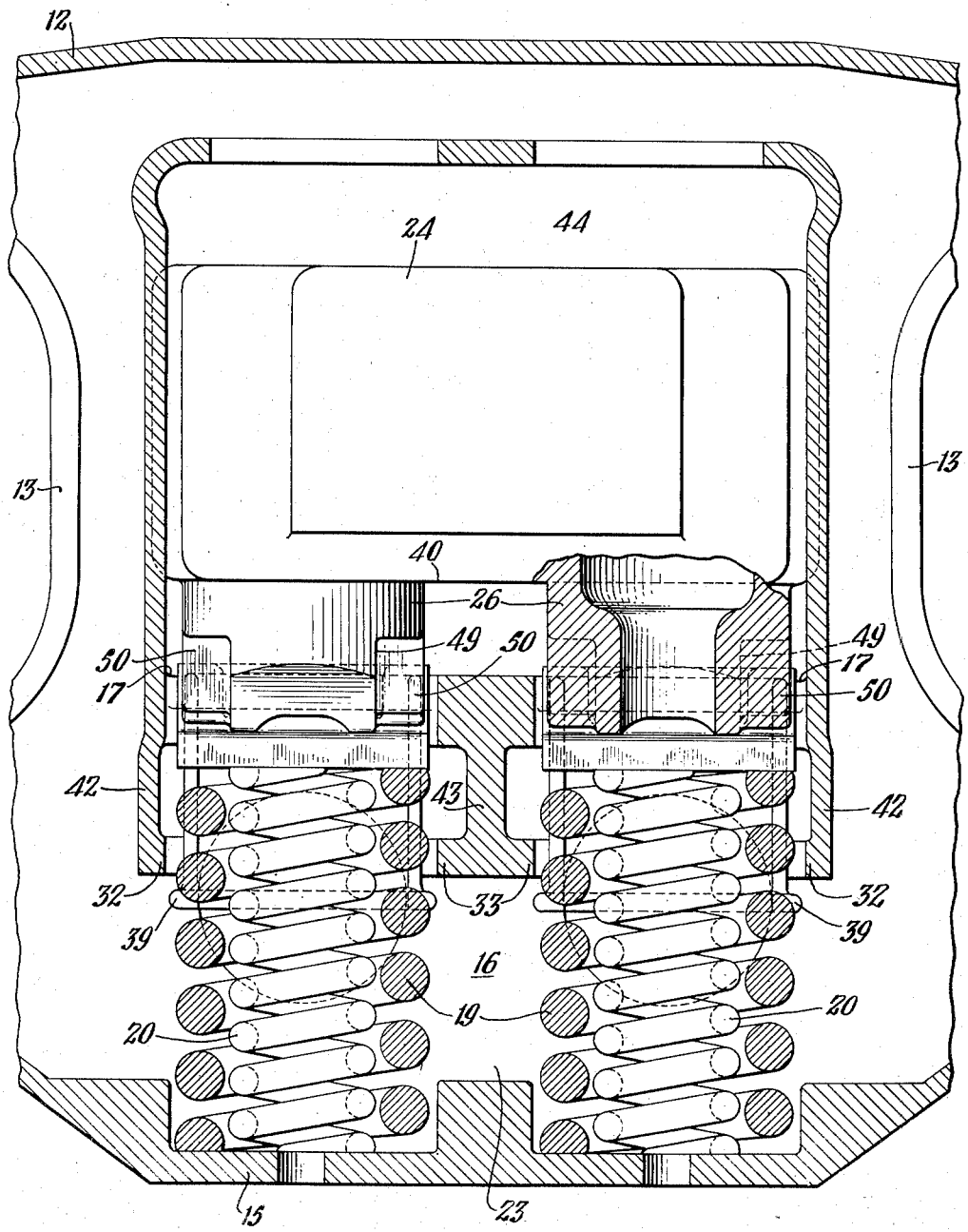
Fig. 4 is an enlarged detail sectional view taken as indicated at 4—4 in Fig. 1, the bolster being shown in elevation, except that one of the projections thereof is in section on the line 4—4.

Referring to the drawings, the side frame 10 is formed with a tension member 11, a compression member 12 and connecting columns 13. The central portion 14 of the tension member comprises a bottom wall 15, side walls 16 and a top wall or shelf 17. In shelf 17 are located vertical openings 18 through which springs 19, 20, friction sleeve unit comprising segments 21, and friction shoes 22 are inserted into the box-like housing 23 formed by walls 15, 16 and shelf 17.

The end 24 of truck bolster 25 is received in opening 44 of the side frame 10. On the under surface of bolster end 24 are downwardly extending projections 26, each having a pair of plane wedging surfaces 27, 28. The wedge shaped portions of the projections extend downwardly through openings 18 in shelf 17 into wedging engagement with friction shoes 22.

Extending upwardly from shelf 17 to the under side of top wall 29 of bolster 25 are springs 30, 31 which, acting in parallel with springs 19, 20 form a resilient support for the bolster 25.

Extending downwardly from shelf 17 into housing 23 are outer walls 42 and central wall 43 having flanges 32, 33 projecting inwardly towards springs 19, 20. A pair of friction sleeve segments 21 are received in each of the openings 18. Each sleeve segment is formed with an outwardly extending flange 47 at its upper end which is arranged to be received in a recess 45 of shelf 17 and to be supported on the shoulder 46 thus formed to prevent the sleeve segment from moving vertically downward. The upper surface of the sleeve segments is slightly above the plane of the upper surface of the shelf 17, as shown in Fig. 3. Upward movement of the sleeve segments 21 is prevented by the overlapping of a portion of one of the springs 30 with a portion of the sleeve or of the flange 47 thereof. Rotation of the sleeves is prevented by the engagement of the corners 47' of the flanges 47 with the corners of the complementary recesses 45 in the side frame shelf.

Friction shoes 22 rest on springs 19, 20 and are partially encased by sleeve segments 21. Laterally extending lugs 35 on the friction shoes prevent rotation of the shoes by engagement with ends 36 (Fig. 5) of sleeve segments 21. Each of the shoes 22 has a curved surface 37 for engagement with the inner surface of the adjacent sleeve segment 21. It will be observed that the radius of curvature of the cylindrical friction shoe surfaces is slightly smaller than the radius of curvature of the cylindrical surfaces of the sleeve segments 21. This is for the purpose of having the initial wear occur at the central portion of the sleeve segments and shoe along the line of action of the thrust from the wedge surfaces, thus eliminating any bending stresses in the shoes or sleeve segments, and also causing the shoes to wear until their surfaces substantially conform to the cylindrical surfaces of the sleeve segments.

Each of the bolster projections 26 is recessed or flattened at 49 to provide laterally extending downwardly projecting lugs 50 for engagement with the lugs 35 of the friction shoes (Fig. 3) to limit movement of the bolster transversely of the side frame. This arrangement maintains adequate thrust surfaces between the truck bolster and the friction shoes associated with the side frame without interfering in any way with the wedging contact between the bolster and friction shoes.

Upon downward movement of the bolster relative to the side frame, friction shoes 22 are forced outwardly against friction sleeve segments 21 by wedge surfaces 27, 28 on bolster projections 26. The absorption of the energy of the movement quickly brings to a stop any oscillations of the springs, thus preventing subsequent shocks from building up the amplitude of the spring oscillations to a point where damage might be done to the car lading.

The springs are prevented from going solid, in the event of an unusually heavy blow, by the engagement of the under surface 40 of the bolster with the top surface of shelf 17 and sleeve segments 21.

In assembly my car truck, friction sleeve segments 21 are first inserted in the openings 18 and lowered into position with the flanges 47 resting on the shoulders 46 of the side frame. These sleeve segments are correctly positioned by abutment of the corners of the flanges 47 with the corners of the recesses 45 in the side frame. Springs 19, 20 are then inserted into the housing 23. The friction shoes 22 are next placed in sleeve 21 and positioned by lugs 35 and ends 36 of the sleeve segments. The springs 30, 31 are assembled with the bolster, and the bolster end 24 is then inserted into opening 44 of the side frame and lowered until wedge surfaces 27, 28 on the bolster projections contact wedge surfaces 38, on the friction shoes. It will be observed that in the assembly each part is accurately positioned and locked in place by the part previously assembled, and that after a unit has been inserted, no further positioning of that unit is needed to enable the next unit to be properly positioned.

When one of the side frames of the car truck tends to run ahead of the other, such as the case would be in rounding a curve, one bolster projection tends to slide up the wedge surfaces of one of the friction shoes, while the other projection tends to slide up the wedge surfaces of the shoe diagonally opposite the aforesaid shoe, causing a vertical displacement of the bolster and the car. As the bolster projections rise on the one set of diagonally opposed shoes, the other diagonally opposed set is left free. Thus, when the force tending to keep the truck out of square is diminished, the weight of the car and bolster acting on the diagonally opposed wedging surfaces produces a couple which acts to bring the truck back into its proper alignment. The sliding of the projections up the wedge surfaces of the friction shoes is limited by the thrust engagement between the lugs 35 of the shoes and lugs 50 of the projections. This limits the amount the truck can get out of square.

It will be observed that in the preferred embodiment of my invention herein described, I have provided a friction damping mechanism which is adaptable to existing truck designs and which, because of the use of a single pair of wedge surfaces for each friction unit, will insure more uniform bearing contact between the wedge surfaces of the bolster and friction shoes, as well as increased area of contact therebetween, while maintaining adequate vertical thrust surfaces within comparable overall space limitations.

It will further be observed that the wedging surfaces of the bolster projections 26 and friction shoes 22 can be readily machined with the use of the usual grinding equipment. Also, the vertical interlock between the lugs of the projections and friction shoes remains substantially the same regardless of the angle of the wedge surfaces of the bolster and shoes. In this connection it will be noted additionally that the lateral extensions or lugs 50 of the bolster projections 26 terminate above the plane of the wedge surfaces of the bolster projections (see Fig. 3).

The terms and expressions which I have employed are used in a descriptive and not a limiting sense, and I have no intention of excluding such equivalents of the invention described, or of portions thereof, as fall within the purview of the claims.

I claim:

1. In a car truck comprising a bolster and side frames, a friction sleeve unit, a side frame having a support for the friction sleeve unit, a spring arranged in line with the sleeve unit and supported on the side frame, friction shoes arranged for frictional engagement with the sleeve unit and for movement against the resistance of said spring, each friction shoe having a single wedge surface, said single wedge surface being located at its upper end, and the bolster having a wedge surface on its under side for engagement with the wedge surface of each shoe arranged to wedge each shoe outwardly against the friction sleeve unit, the friction shoes having opposed thrust bearing surfaces on each side of the wedge surface thereof, and the bolster having lugs extending between said opposed thrust bearing surfaces of the friction shoes for engagement therewith to resist longitudinal movement of the bolster transversely of the side frame.

2. In a car truck comprising a bolster and side frames, a friction sleeve unit, a side frame having a support for the friction sleeve unit, a spring arranged co-axially with the friction sleeve unit and supported on the side frame, a pair of friction shoes arranged for frictional engagement with the sleeve unit and for movement against the resistance of said spring, each friction shoe having a single wedge surface, said single wedge surface being located at its upper end, and the bolster having a pair of opposed wedge surfaces on its under side for engagement with the wedge surfaces of the shoes arranged to wedge the shoes outwardly against the friction sleeve unit, the bolster having a vertical lug extending laterally of the bolster and between the shoes at the side of the wedge surfaces of the bolster for engagement with the shoes to resist longitudinal movement of the bolster transversely of the side frame.

3. In a car truck comprising a bolster and side frames, a side frame, a pair of friction sleeves supported thereon, each sleeve comprising a pair of arcuate segments, a spring supported on the side frame adjacent each of the friction sleeves, a pair of friction shoes arranged for frictional engagement with each sleeve and seating against the adjacent spring, each friction shoe having a single wedge surface, said single wedge surface being located at its upper end, and the bolster having opposed wedge surfaces on its under side for engagement with the wedge surfaces of each pair of shoes arranged to wedge the shoes outwardly against the friction sleeve, the bolster having a vertical lug extending laterally of the bolster and between the shoes at each side of the wedge surfaces of the bolster for engagement with the shoes.

4. In a car truck, a side frame, a bolster having a pair of depending projections each having a pair of opposed wedge surfaces extending downwardly and inwardly to intersect at points lying substantially along the longitudinal center-line of the side frame, combined spring and friction mechanism associated with the side frame, said mechanism having friction shoes arranged for engagement with said opposed wedge surfaces of the bolster projections, the friction shoes having opposed thrust bearing surfaces on each side of the wedge surfaces of the bolster projections, and the bolster having lugs extending between said opposed thrust bearing surfaces of the friction shoes for engagement therewith to resist longitudinal movement of the bolster transversely of the side frame.

5. In a car truck, a side frame, a bolster having a pair of depending projections each having a pair of opposed wedge surfaces extending downwardly and inwardly to intersect at points lying substantially along the longitudinal center-line of the side frame, combined spring and friction mechanism associated with the side frame, said mechanism having friction shoes arranged for engagement with said opposed wedge surfaces of the bolster projections, and the bolster projections having lugs extending laterally of the bolster at opposite sides of said bolster projections, said lugs extending between the side edges of the friction shoes.

JAMES A. SHAFER.

REFERENCES CITED

The following references are of record in the file of this patent:

UNITED STATES PATENTS

| Number | Name | Date |
| --- | --- | --- |
| 1,695,085 | Cardwell | Dec. 11, 1928 |
| 1,787,588 | Nash | Jan. 6, 1931 |
| 1,812,723 | Sproul | June 30, 1931 |
| 2,187,434 | Shafer | Jan. 16, 1940 |